(12) United States Patent
Kippley et al.

(10) Patent No.: US 8,897,029 B2
(45) Date of Patent: Nov. 25, 2014

(54) COMPACT ISOLATED SWITCHING POWER CONVERTERS

(75) Inventors: Robert H. Kippley, Eagan, MN (US); Bradley J. Schumacher, Savage, MN (US); Gary P. Magnuson, Chanhassen, MN (US); Kwong K. Chin, Fremont, CA (US)

(73) Assignee: Astec International Limited, Kwun Tong, Kowloon (HK)

( * ) Notice: Subject to any disclaimer, the term of this patent is extended or adjusted under 35 U.S.C. 154(b) by 392 days.

(21) Appl. No.: 13/243,587

(22) Filed: Sep. 23, 2011

(65) Prior Publication Data

US 2013/0077276 A1 Mar. 28, 2013

(51) Int. Cl.
*H05K 1/11* (2006.01)
*H02M 7/00* (2006.01)
*H02M 3/00* (2006.01)

(52) U.S. Cl.
CPC ............... *H02M 7/003* (2013.01); *H02M 3/00* (2013.01)
USPC ........... 361/784; 361/772; 361/742; 361/803; 361/740

(58) Field of Classification Search
USPC ................................................ 363/123, 127
See application file for complete search history.

(56) References Cited

U.S. PATENT DOCUMENTS

| | | | | |
|---|---|---|---|---|
| 3,934,177 | A | * | 1/1976 | Horbach ........................ 361/709 |
| 4,039,900 | A | * | 8/1977 | Roback et al. ................ 361/709 |
| 4,206,435 | A | * | 6/1980 | Harris et al. ..................... 336/65 |
| 4,339,792 | A | | 7/1982 | Yasumura et al. |
| 4,467,399 | A | | 8/1984 | Van Husen |
| 4,652,975 | A | * | 3/1987 | Scott ............................. 361/772 |
| 4,661,792 | A | | 4/1987 | Watkins |
| 4,712,160 | A | * | 12/1987 | Sato et al. ...................... 361/710 |
| 5,923,526 | A | * | 7/1999 | Kangas ......................... 361/627 |
| 6,437,673 | B1 | * | 8/2002 | Nishida et al. .................. 336/90 |
| 7,978,489 | B1 | * | 7/2011 | Telefus et al. ................. 363/146 |
| 2007/0015416 | A1 | * | 1/2007 | Gutierrez et al. ............. 439/676 |
| 2007/0152795 | A1 | * | 7/2007 | Zeng et al. .................... 336/212 |
| 2007/0194875 | A1 | * | 8/2007 | Wang et al. ................... 336/199 |
| 2010/0188830 | A1 | * | 7/2010 | Tsai et al. ...................... 361/782 |
| 2011/0074533 | A1 | | 3/2011 | Phadke |

* cited by examiner

*Primary Examiner* — Tuan T Dinh
*Assistant Examiner* — Steven T Sawyer
(74) *Attorney, Agent, or Firm* — Harness, Dickey & Pierce, P.L.C.

(57) ABSTRACT

An isolated switching power converter includes a power isolation transformer having at least one primary winding, at least one secondary winding and a plurality of sides, a first power board mechanically coupled to a first side of the transformer, and a second power board mechanically coupled to a second side of the transformer. The first power board includes a primary side circuit electrically coupled to the at least one primary winding, and the second power board includes a secondary side circuit electrically coupled to the at least one secondary winding.

27 Claims, 7 Drawing Sheets

COMPACT ISOLATED SWITCHING POWER CONVERTERS

FIELD

The present disclosure relates to compact isolated switching power converters.

BACKGROUND

This section provides background information related to the present disclosure which is not necessarily prior art.

Figure 1:
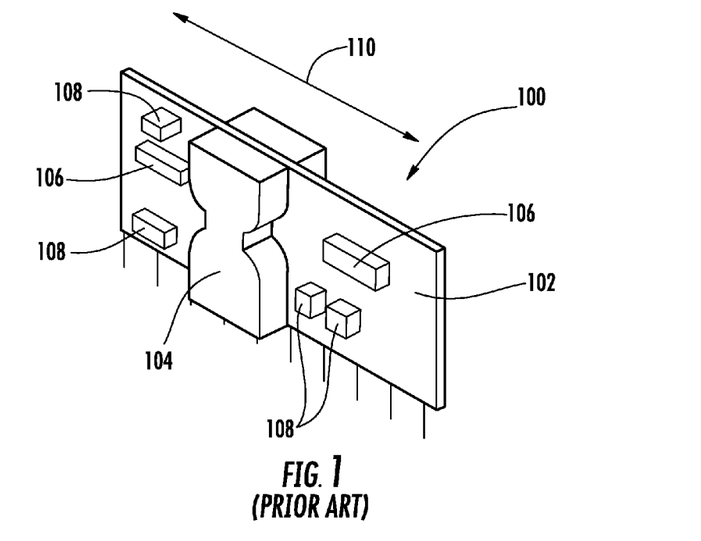
FIG. 1 illustrates an isolated power converter according to the prior art.

FIG. 1 illustrates a conventional isolated power converter 100 that generally includes a transformer 104, switching devices 106 and other electrical components 108 (e.g., capacitors, inductors, resistors, etc.) mounted on or integrated into a circuit board 102. FIG. 1 also illustrates the direction of airflow required (i.e., in-line with a peripheral edge of the circuit board 102) for proper cooling of the power converter 100 via arrow 110.

Figure 2:
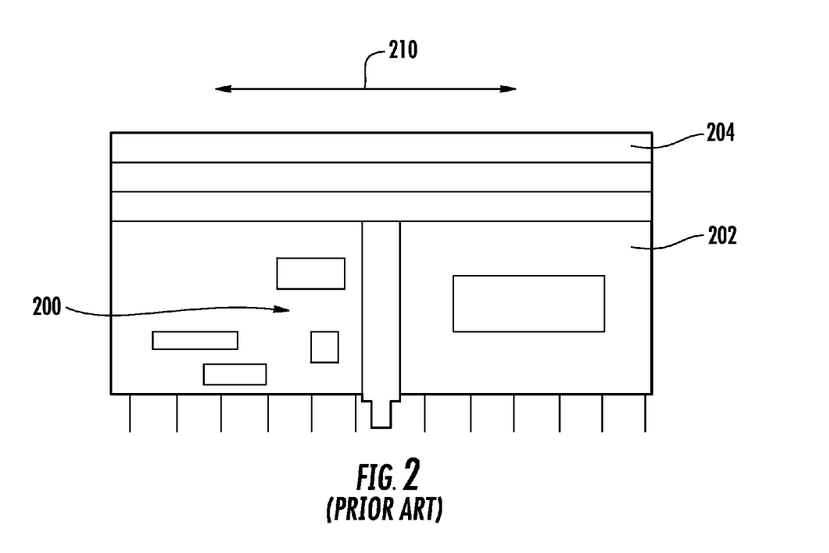
FIG. 2 illustrates a non-isolated power converter having a heatsink according to the prior art.

FIG. 2 illustrates a conventional non-isolated power converter 200. A heatsink 204 is positioned along a peripheral edge of a circuit board 202 and thermally coupled to one or more components of the power converter 200 for dissipating heat. FIG. 2 also illustrates the direction of airflow required (i.e., in-line with the peripheral edge of the circuit board 202) for proper cooling of the power converter 200 via arrow 210.

SUMMARY

This section provides a general summary of the disclosure, and is not a comprehensive disclosure of its full scope or all of its features.

According to one aspect of the present disclosure, an isolated switching power converter includes a power isolation transformer having a primary winding, a secondary winding and a plurality of sides, a first power board mechanically coupled to a first side of the transformer, and a second power board mechanically coupled to a second side of the transformer. The first power board includes a primary side circuit electrically coupled to the primary winding, and the second power board includes a secondary side circuit electrically coupled to the secondary winding.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
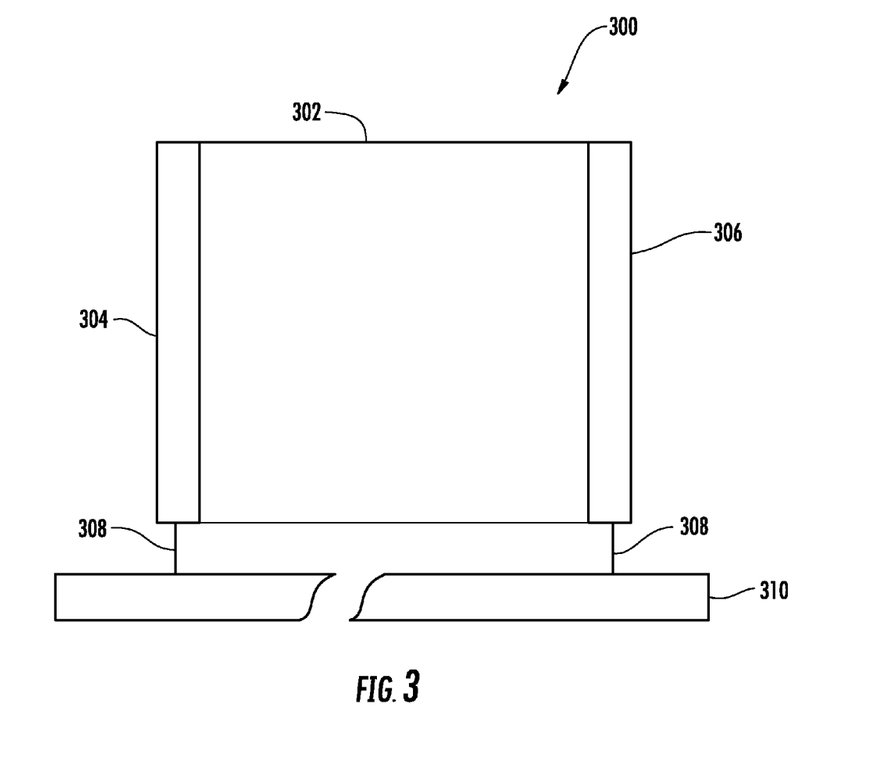
FIG. 3 is a front view of an isolated switching power converter according to one example embodiment of the present disclosure.

An isolated switching power converter according to one example embodiment of the present disclosure is illustrated in FIG. 3 and indicated generally by reference number 300. As shown in FIG. 3, the isolated switching power converter 300 includes a power isolation transformer 302 having a primary winding, a secondary winding and a plurality of sides. The isolated switching power converter 300 further includes a first power board 304 mechanically coupled to a first side of the transformer 302 and a second power board 306 mechanically coupled to a second side of the transformer 302. The first power board 304 includes a primary side circuit electrically coupled to the primary winding of the transformer 302 and the second power board 306 includes a secondary side circuit electrically coupled to the secondary winding of the transformer 302.

As apparent to those skilled in the art, the transformer 302 may include one or more primary windings and one or more secondary windings. Further, while only one transformer 302 is illustrated between the first and second power boards 304, 306 in FIG. 3, multiple transformers may be used instead.

As shown in FIG. 3, the first power board 304 and the second power board 306 may include electrical terminals 308 for electrically coupling the first power board 304 and the second power board 306 (and, more generally, the power converter 300) to one or more other circuit boards 310 (such as system boards, server boards, internal power supply mother boards, etc.). The electrical terminals 308 may be pins (e.g., as shown in FIG. 3), surface mount terminals, and/or other suitable electrical terminals.

The first power board 304 and the second power board 306 are shown on opposing sides of the transformer 302 and oriented parallel to one another. However, other suitable mounting configurations may be utilized without departing from the teachings of the present disclosure.

The first power board 304 and the second power board 306 include power electronics and may be, e.g., printed circuit boards or other suitable circuit boards.

A small dimensional footprint can be obtained by coupling the first power board 304 and the second power board 306 to the transformer 302. That is, the surface area needed to electrically couple the isolated switching power converter 300 to one or more other circuit boards can be small.

Figure 4A:
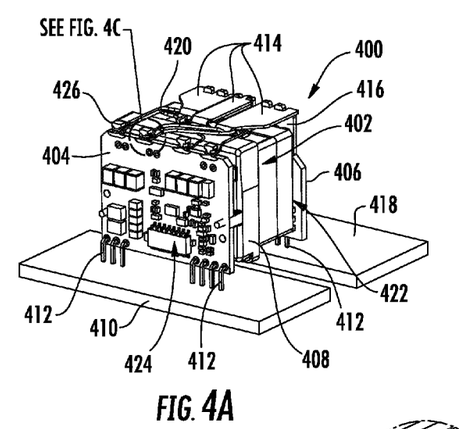
FIG. 4A is an isometric view of an isolated switching power converter according to another example embodiment of the present disclosure.
Figure 4B:
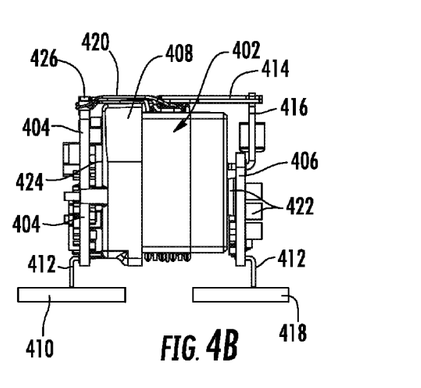
FIG. 4B is a front view of the isolated switching power converter of FIG. 4A.

FIGS. 4A and 4B illustrate another example embodiment of an isolated switching power converter 400. As shown in FIGS. 4A and 4B, the isolated switching power converter 400 includes a transformer 402 having at least one primary winding and at least one secondary winding. The isolated switching power converter 400 further includes a first power board 404 mechanically coupled to a first side of the transformer 402 and a second power board 406 mechanically coupled to a second side of the transformer 402.

The isolated switching power converter 400 shown in FIGS. 4A and 4B (as well as other power converters disclosed herein) is preferably cuboidal (i.e., cube-shaped). The cuboidal shape may allow for a higher power density over other shapes and configurations and can provide a small dimensional footprint (e.g., on circuit boards 410, 418) while maintaining a high efficiency. The cuboidal shape and small dimensional footprint can also allow for greater placement flexibility. The cuboidal shape may also be advantageous when it allows the isolated switching power converter to be placed in any desired orientation on the circuit board(s), regardless of the direction of cooling airflow In other words, a power converter having a cuboidal shape may be properly cooled with airflow from any direction, such as from any side or top surface of the power converter. In that event, the orientation of the power converter on the circuit board(s) is not constrained by the direction of cooling airflow. Alternatively, however, other suitable (i.e., non-cuboidal) shapes and configurations may be employed without departing from the teachings of the present disclosure.

Figure 4C:
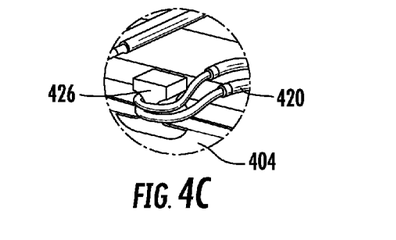
FIG. 4C is an enlarged view of the encircled portion of FIG. 4A.

The first power board 404 (and the other power boards disclosed herein) may include one or more wire wrap terminals 426 electrically connected to the primary (or secondary) side circuit. In this manner, e.g., the primary winding of transformer 402 may be electrically connected to the primary side circuit on the first power board 404 by wrapping the winding wires (or lead wires) around the wire wrap terminals 426, as shown in FIGS. 4A and 4C. As shown in FIG. 4A, four wire wrap terminals 426 extend above a top peripheral edge of the first power board 404. In other embodiments, more or less (or no) wire wrap terminals, extending in any desired direction, may be employed.

The isolated switching power converter 400 may further include one or more busbars 414 electrically connected to the secondary winding of the transformer 402. The secondary winding of the transformer 402 may be a plate winding or any other suitable winding. In the example embodiment of FIG. 4, the busbar 414 is formed monolithically with the secondary plate winding of the transformer 402. That is, the busbar 414 and the secondary plate winding are formed as a single part or component. Additionally, and as shown in FIG. 4, the busbar 414 and the second power board 406 may be configured for mechanically interlocking with one another. For example, the busbar 414 may include slots for receiving and interlocking with one or more conductors 416 that are coupled to the second power board 406. The busbar 414, the conductors 416, 420, the at least one primary winding and the at least one secondary winding may comprise copper (including copper alloys) and/or other suitable conductive materials.

The busbar 414 may additionally serve as a heatsink for the isolated switching power converter 400. Thus, the isolated switching power converter 400 may not require a heat sink. In that event, the overall size and/or dimensional footprint of the isolated power converter 400 may be further reduced.

The first and second power boards 404, 406 may be mechanically coupled to the transformer 402 using any suitable means. For example, the power boards 404, 406 may be mechanically coupled to the transformer 402 by pins, rivets, fasteners, adhesives, etc. Additionally, and as noted above, the busbar 414 may interlock with one or more conductors 416 of the secondary side circuit on the second power board 406. This mechanical configuration may also serve to (or assist in) mechanically coupling the second power board 406 to the transformer 402.

In one preferred embodiment, the first power board 404 and the second power board 406 are mechanically and thermally coupled to first and second sides of the transformer 402 via a conductive epoxy. The conductive epoxy may be any suitable conductive epoxy including, for example, a Gap Filler, Bondply, a Liquibond, a thermally conductive epoxy, another suitable thermal compound, etc.

As shown in FIG. 4B, the first power board 404 includes a primary side circuit 424 electrically coupled to one or more primary windings and the second power board 406 includes a secondary side circuit 422 electrically coupled to one or more secondary windings. The primary side circuit 424 and the secondary side circuit 422 each include one or more switches.

One or more switches of the primary side circuit 424 may be positioned between the first power board 404 and the first side of the transformer 402. Similarly, one or more switches of the secondary side circuit 422 may be positioned between the second power board 406 and the second side of the transformer 402. Additionally, or alternatively, one or more switches of the primary side circuit 424 and/or secondary side circuit 422 may be positioned on external sides of the first and second power boards 106, 108.

Although a variety of switching devices may be employed without departing from the scope of this disclosure, the switches of the primary and secondary side circuits 422, 424 are preferably field-effect transistors ("FETs") and, more preferably, thin FETs having a thickness less than 0.04 inches (1 mm). In this manner, the overall size and dimensional footprint of the isolated switching power converter 400 (and converters of other embodiments) may be further reduced. Additionally or alternatively, FETs having a thickness greater than or equal to 0.04 inches may be used.

Furthermore, one or more switches of the secondary side circuit 422 may be self-driven synchronous rectifiers (preferably comprising thin FETS) so that a gate drive signal from the primary side circuit on the first power board 404 is not required by the secondary side circuit on the second power board 406. Preferably, no wires extend from the first power board 404 to the second power board 406 of the isolated switching power converter 400 so the only electrical connection between the first power board 404 and the second power board 406 is through the transformer 402. This configuration may also contribute to the cuboidal shape described above. U.S. patent application Ser. No. 12/886,703 (filed Sep. 21, 2010), which is incorporated herein by reference in its entirety, discloses a drive circuit configuration as described above.

Additionally, one or more switches of the primary and secondary side circuits 422, 424 may be low charge FETs having low internal capacitances and short voltage transients during switching. This results in reduced switching losses within the FET and thus improves the efficiency of the isolated switching power converter.

The isolated switching power converter 400 may further include an electrical isolator 408. As shown in FIGS. 4A and 4B, the electrical isolator 408 is positioned on the first side of the transformer 402 between the first power board 404 and the transformer 402 to provide electrical isolation therebetween. The electrical isolator preferably has a thickness of 0.016 inches (0.4 mm) or greater. Additionally, the electrical isolator 408 may extend around and beyond the first side of the transformer, (i.e., toward the second power board 406), and preferably creates a creepage distance between the transformer 402 and the primary power board 404 of 0.25 inches (6.4 mm) or greater.

The electrical isolator 408 may include structure for aligning the first power board 404 with the first side of the transformer 402 such as pins, grooves, or other suitable features that assist in alignment. Additionally, the electrical isolator 408 may include electrical terminals (e.g., pins) for terminating the primary windings of the transformer 402.

The first power board 404 and the second power board 406 may include electrical terminals 412 for electrically coupling the first power board 404 and the second power board 406 to one or more other circuit boards. As shown in FIG. 4, the first power board 404 may be electrically coupled to a circuit board 410, and the second power board 406 may be electrically coupled to a circuit board 418, via the electrical terminals 412. In the example embodiment of FIG. 4, the electrical terminals are pins. However, other suitable terminals (e.g., surface mount terminals) may be used. When employed, the electrical terminals 412 may electrically couple the isolated switching power converter 400 to one or more other circuit boards (e.g., circuit boards 410, 418) in an electronic system (e.g., a computer device or system, such as a computer server).

Although any suitable transformers can be used, the transformer 402 of the isolated switching power converter 400 is preferably a center tapped transformer. Suitable center tapper transformers are disclosed in U.S. patent application Ser. No. 12/570,105 filed Sep. 30, 2009, the entire disclosure of which is incorporated herein by reference.

Additionally, the transformer 402 is preferably constructed as a subassembly that does not include a bobbin. Alternatively, the transformer 402 may include a bobbin if desired, discloses a center tapped transformer for isolated switching power converters.

Although FIGS. 4A and 4B illustrate transformer 402 as a single transformer, more than one transformer may be employed in any embodiment without departing from the teachings of this disclosure.

The first power board 404 of the isolated switching power converter 400 may further include a controller for controlling one or more switches of the primary side circuit 424, as well as resonant capacitors and other switching power converter components. The second power board 406 may include synchronous rectifiers, output capacitors and other secondary side components. The first power board 404 and the second power board 406 are preferably configured to allow the end user to add additional input and/or output filtering as desired. Furthermore, a leakage inductance of the transformer 402 may be utilized for resonant operation so that no additional input or output inductors may be required for the isolated switching power converter 400.

Figure 5A:
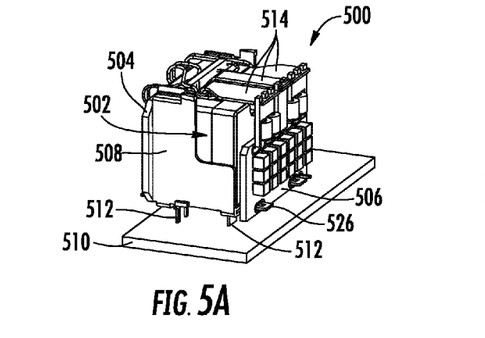
FIG. 5A is an isometric view of an isolated switching power converter according to yet another example embodiment of the present disclosure.
Figure 5B:
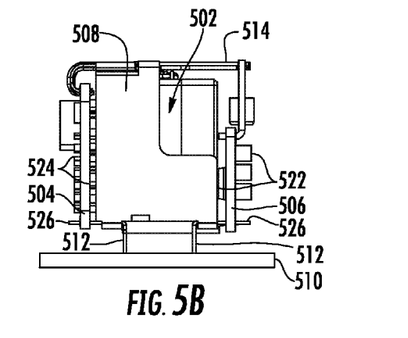
FIG. 5B is a front view of the isolated switching power converter of FIG. 5A.

FIGS. 5A and 5B illustrate yet another example embodiment of an isolated switching power converter 500. Similar to FIGS. 3-4, the isolated switching power converter 500 of FIG. 5 includes a transformer 502, a first power board 504 and a second power board 506. The first power board 504 is mechanically coupled to a first side of the transformer 502 and the second power board 506 is mechanically coupled to a second side of the transformer 502. The first power board 504 includes a primary side circuit 524 electrically coupled to one or more primary windings of the transformer 502. The second power board 506 includes a secondary side circuit 522 electrically coupled to one or more secondary windings of the transformer 502. Similar to FIG. 4, the primary side circuit 524 and the secondary side circuit 522 of FIG. 5 may each include one or more switches (such as, e.g., thin FETs and self-driven synchronous rectifiers).

The transformer 502 may include one or more busbars 514 electrically connected to its secondary winding(s). The busbar 514 of FIG. 5 may employ the same features as the busbar 414 discussed above and illustrated in FIG. 4.

The isolated switching power converter 500 may further include a nonconductive carrier 508. As shown in FIGS. 5A and 5B, the nonconductive carrier 508 extends about multiple side portions of the transformer 502 for providing electrical isolation between the transformer 502 and the primary power board 504. In one preferred embodiment, the nonconductive carrier 508 creates a creepage distance of at least 0.25 inches (6.4 mm) between the transformer 502 and the primary power board 504.

Additionally, the nonconductive carrier 508 may include structure for aligning the first power board 504 and the second power board 506 with the first side and the second side, respectively, of the transformer 502. For example, the nonconductive carrier 508 may include projections 526 extending therefrom, as shown in FIGS. 5A and 5B, that are configured to align the first and second power boards 504, 506 with the first and second sides of the transformer.

The nonconductive carrier 508 may further include electrical terminals 512 electrically connected to the first power board 504 and the second power board 506 for electrically coupling the first power board 504 and the second power board 506 to one or more other circuit boards. For example, and as shown in FIG. 5, the first power board 504 and the second power board 506 may be electrically coupled to a circuit board 510 via the nonconductive carrier 508 and its electrical terminals 512. The electrical terminals 512 may be pins (e.g., as shown in FIG. 5), surface mount terminals or other suitable terminals. Accordingly, when employed, the electrical terminals 512 may electrically couple the isolated switching power converter 500 to another circuit (e.g., via the circuit board 510) in an electronic system (e.g., a computer server).

Although the isolated switching power converter 500 may be configured differently than the isolated switching power converters 300, 400 illustrated in FIGS. 3 and 4, it may employ any of the features and configurations mentioned above and/or illustrated in FIGS. 3 and 4. For example, the isolated switching power converter 500 of FIG. 5 may employ the same features of the isolated switching power converters 300, 400 of FIGS. 3 and 4 that contribute to a compact size and/or small dimensional footprint while maintaining high efficiency.

Figure 6A:
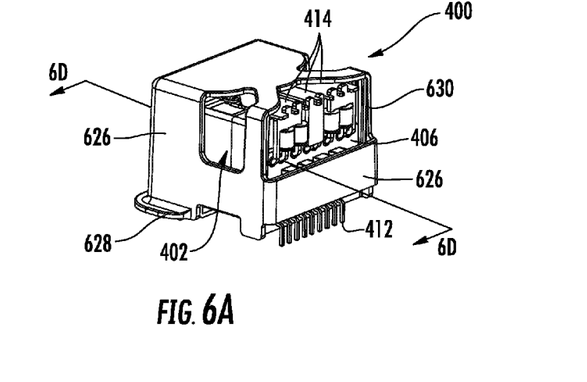
FIG. 6A is an isometric view of the isolated switching power converter of FIGS. 4A and 4B with a nonconductive cover.
Figure 6B:
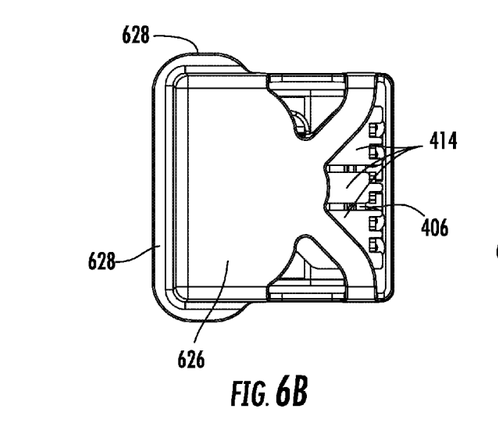
FIG. 6B is a top view of the assembly of FIG. 6A.
Figure 6C:
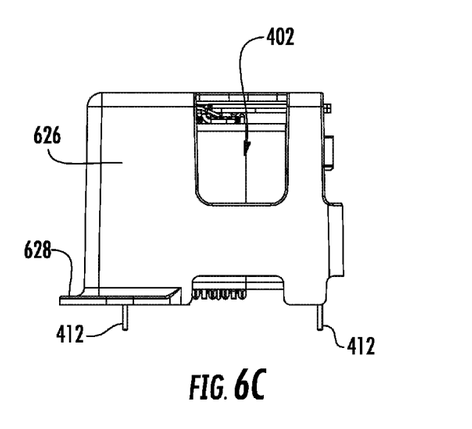
FIG. 6C is a front view of the assembly of FIG. 6A.
Figure 6D:
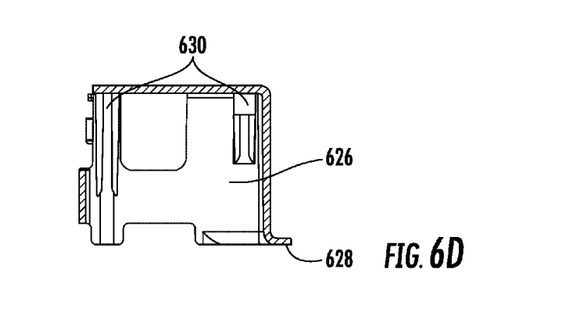
FIG. 6D is a sectional view taken along line 6D-6D in FIG. 6A.

FIGS. 6A-6C illustrate the isolated switching power converter 400 of FIG. 4 with a nonconductive cover 626. As shown in FIG. 6, the nonconductive cover 626 extends over the top and around multiple side portions of the transformer 402. Preferably, the nonconductive cover 626 extends over and around portions of the first power board 404 (not visible in FIG. 6), the first side of the transformer 402, the second power board 406 (partially visible in FIG. 6) and the second side of the transformer 402. In this manner, the nonconductive cover 626 is configured to prevent exposing hazardous voltages to the end user.

Additionally, the nonconductive cover 626 may provide isolation between the transformer 402 and other nearby components (e.g., components on circuit boards 410, 418, 510 in FIGS. 4 and 5). In one preferred embodiment, the nonconductive cover 626 is configured to create a creepage distance of at least 0.25 inches (6.4 mm) between the transformer 402 and any adjacent components.

The nonconductive cover 626 may include an outwardly extending flange 628 that extends along a bottom side edge of the nonconductive cover 626. As shown in FIGS. 6A-6C, the outwardly extending flange 628 may extend around only the primary side of the transformer 402. Additionally, or alternatively, the outwardly extending flange 628 may extend along other portions of the transformer, or entirely around the transformer. The outwardly extending flange 628 may assist in preventing exposure of hazardous voltages to the end user by increasing the creepage distance between the isolated switching power converter 400 and adjacent components The nonconductive cover 626 may also be configured for pick and place manufacturing operations. For example, the top side of the cover 626 may include a flat surface and/or other features (e.g., molded into the cover 626) for use by vacuum pick up nozzles, pick and place robotics, or other pick and place mechanisms for positioning and/or relocating the isolated switching power converter 400.

The nonconductive cover 626 may additionally include structure (e.g., pins, grooves, fingers, etc.) for aligning the first power board 404 and/or the second power board 406 with the transformer 402. For example, and as shown in FIG. 6A, the cover 626 may be molded to define grooves 630 on its interior side adjacent the four corners of the cover for receiving the first and second power boards 404, 406. These grooves may also be used to hold the first and second power boards 404, 406 in place while the first and second boards are mounted to the transformer 406 with a suitable adhesive (e.g., Gap Filler, Bondply, Liquibond, a thermally conductive epoxy, another suitable thermal compound, etc.).

The nonconductive cover 626 may further include inner motherboard layers extending about the interior portion of the nonconductive cover 626. The inner motherboard layers may be used to route high voltage paths within the nonconductive cover 626.

Additionally, and as shown in FIGS. 6A-6C, the nonconductive cover 626 may be vented (i.e., the cover may include one or more vent openings) adjacent the secondary side of the transformer 402 to facilitate cooling of the isolated switching power converter 400.

The isolated switching power converter 400 of FIG. 6 may additionally (or alternatively) employ any of the other configurations and features described above and/or illustrated in FIGS. 3-5.

Figure 7A:
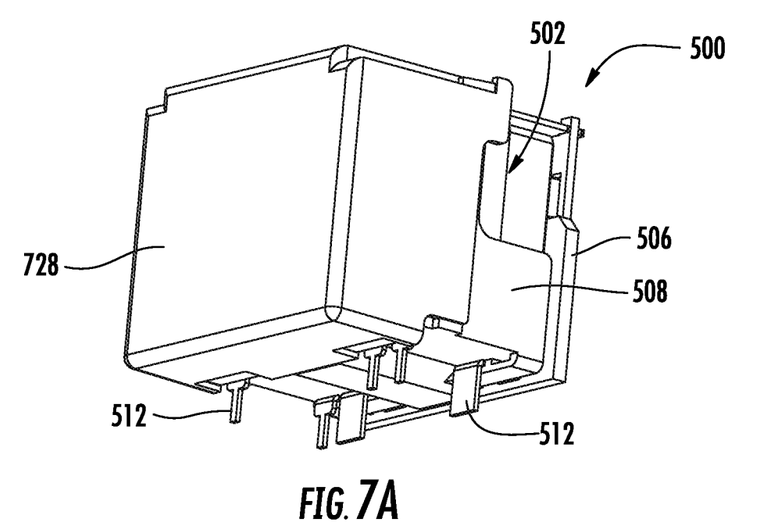
FIG. 7A is an isometric view of the isolated switching power converter of FIGS. 5A and 5B with a nonconductive cover.
Figure 7B:
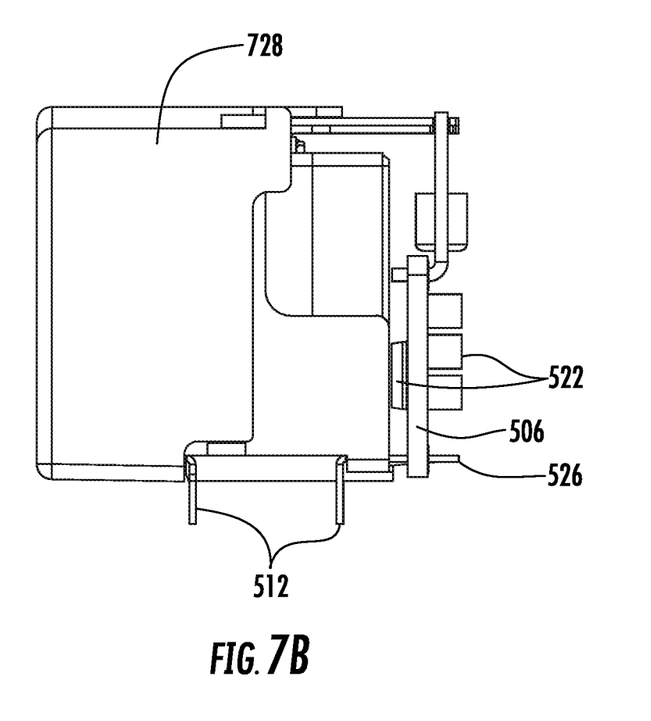
FIG. 7B is a front view of the assembly of FIG. 7A.

FIGS. 7A and 7B illustrate the isolated switching power converter 500 of FIG. 5 with a nonconductive cover 728. Similar to the nonconductive cover 626 of FIG. 6, the nonconductive cover 728 of FIG. 7 extends over and around multiple side portions of the transformer 502. For example, and as shown in FIG. 7, the nonconductive cover 728 extend over and around the first power board 504 (not visible in FIG. 7) and the first (primary) side of the transformer 502.

Although illustrated differently, the nonconductive cover 728 of FIG. 7 may employ the same configuration(s) and characteristic(s) as the nonconductive cover 626 of FIG. 6. Similarly, the isolated switching power converter 500 of FIG. 7 may additionally (or alternatively) employ any suitable configuration(s) and characteristic(s) mentioned above and/or illustrated in FIGS. 3-6.

Figure 8A:
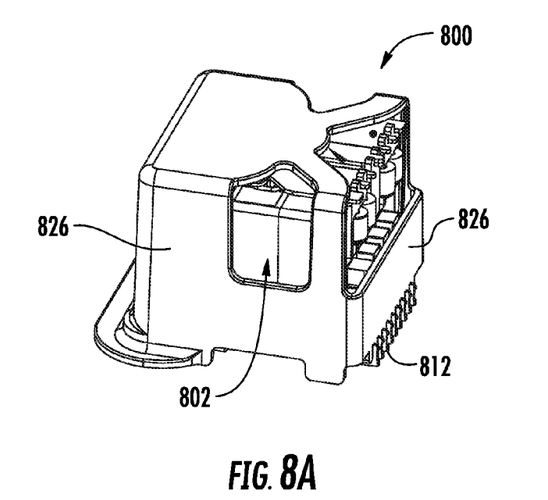
FIG. 8A is an isometric view of an isolated switching power converter according to still another example embodiment.
Figure 8B:
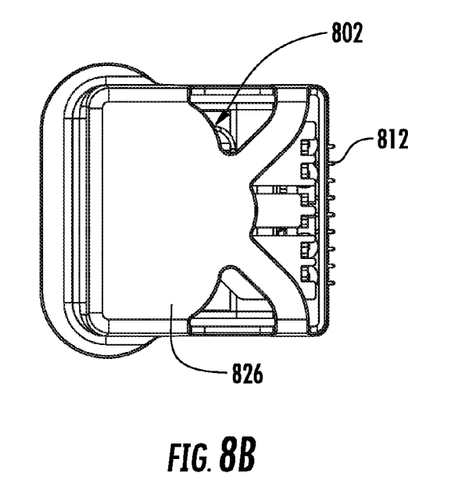
FIG. 8B is a top view of the isolated switching power converter of FIG. 8A.
Figure 8C:
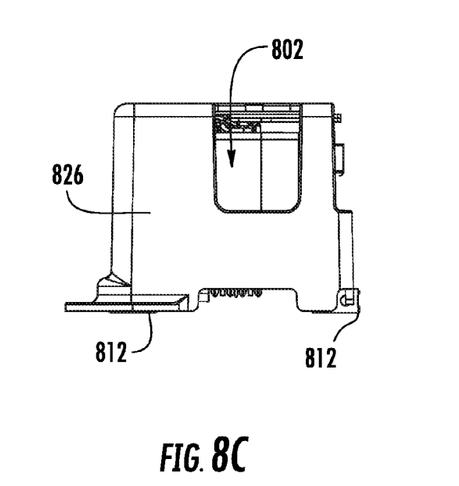
FIG. 8C is a front view of the isolated switching power converter of FIG. 8A.

FIGS. 8A-8C illustrate still another example embodiment of an isolated switching power converter 800. Similar to FIG. 6, the isolated switching power converter 800 of FIG. 8 includes a nonconductive cover 826.

As in FIGS. 4 and 6, the isolated switching power converter 800 of FIG. 8 includes a first power board and a second power board mechanically coupled to a transformer 802. The first power board and the second power board may include electrical terminals 812 for electrically coupling the first power board and the second power board to one or more other circuit boards. As shown in FIG. 8, the electrical terminals 812 may be, e.g., surface mount terminals. Accordingly, when employed, the electrical terminals 812 may couple the isolated switching power converter 800 to one or more other circuit boards (e.g., the circuit boards 410, 418 of FIG. 4 or the circuit board 510 of FIG. 5) in an electronic system (e.g., a computer server).

The isolated switching power converter 800 of FIG. 8 may additionally employ any suitable configuration(s) and characteristic(s) mentioned above and/or illustrated in FIGS. 3-7.

Figure 9A:
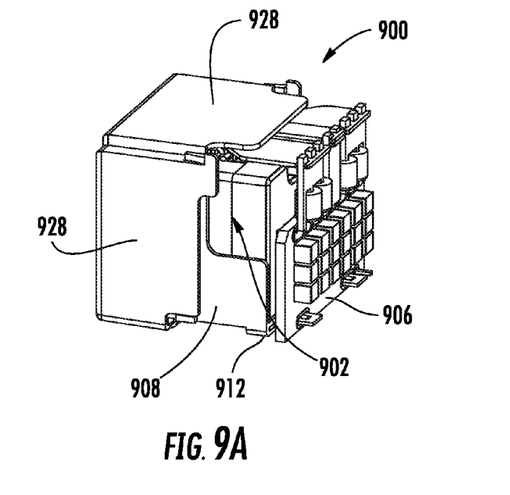
FIG. 9A is an isometric view of an isolated switching power converter according to an additional example embodiment.
Figure 9B:
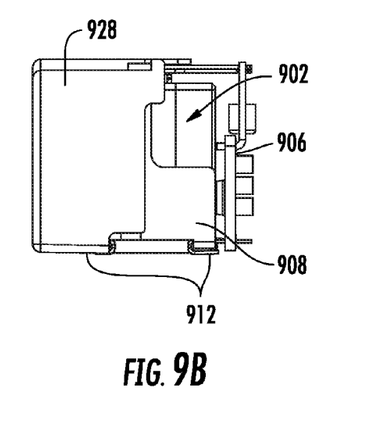
FIG. 9B is a front view of the isolated switching power converter of FIG. 9A.

FIGS. 9A and 9B illustrate yet another example embodiment of an isolated switching power converter 900 according to the present disclosure. Similar to FIG. 7, the isolated switching power converter 900 of FIG. 9 includes a nonconductive cover 928. Additionally, and similar to FIGS. 5 and 7, the isolated switching power converter 900 of FIG. 9 includes a nonconductive carrier 908 extending around side portions of a transformer 902. The nonconductive carrier 908 includes electrical terminals 912 electrically connected to the first power board and the second power board 906 for electrically coupling the first power board and the second power board 906 to one or more other circuit boards. As shown in FIG. 9, the electrical terminals 912 are surface mount terminals. Accordingly, when employed, the electrical terminals 912 may couple the isolated switching power converter 900 to one or more other circuit boards (e.g., the circuit boards 410, 418, 510 in FIGS. 4 and 5) in an electronic system (e.g., a computer server).

The self contained power converter 900 of FIG. 9 may additionally (or alternatively) employ any suitable configuration(s) and characteristic(s) mentioned above and/or illustrated in FIGS. 3-8.

Figure 10:
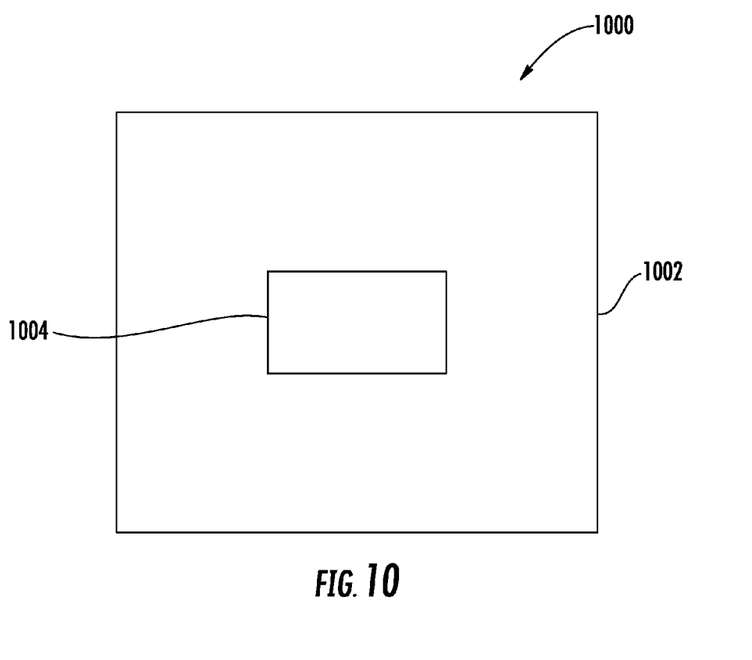
FIG. 10 is a block diagram of a computer server having an isolated switching power converter according to the present disclosure.

FIG. 10 illustrates a system 1000 according to another example embodiment of this disclosure. The system 1000 includes a computer server 1002 having an isolated switching power converter 1004. Any of the isolated switching power converters described herein may be used as the isolated switching power converter 1004, which may have any desired combination of features and configurations described herein.

When employed, the isolated switching power converters mentioned above and/or illustrated in FIGS. 3-9 create a small dimensional footprint while maintaining a high efficiency. For exemplary purposes only, testing has shown that isolated switching power converters according to the present disclosure and having an input voltage of 365Vdc can provide an output voltage of 12Vdc with an output power of up to 600 W while maintaining an efficiency of 97.7%. Additionally, these isolated switching power converters may have a power density of up to 307 W/in$^3$ and a power footprint as high as 173 W/in$^2$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. An isolated switching power converter comprising:
    a power isolation transformer having a primary winding, a secondary winding and a plurality of sides;
    a first power board mechanically coupled to a first side of the transformer and including a primary side circuit electrically coupled to the primary winding;
    a second power board mechanically coupled to a second side of the transformer and including a secondary side circuit electrically coupled to the secondary winding, the first power board and the second power board including electrical terminals for electrically coupling the first power board and the second power board to one or more other circuit boards; and
    a nonconductive cover extending over and around at least portions of the transformer and the first power board, wherein the nonconductive cover is vented adjacent the secondary winding.

2. The power converter of claim 1 wherein the electrical terminals are pins or surface mount terminals.

3. The power converter of claim 1 wherein the primary side circuit includes at least one switch and the secondary side circuit includes at least one switch.

4. The power converter of claim 1 wherein there is no electrical connection between the first power board and the second power board except through the transformer.

5. The power converter of claim 1 wherein the first power board and the second power board are mechanically and thermally coupled to the first side and the second side, respectively, of the transformer via a conductive epoxy.

6. The power converter of claim 1 further comprising a busbar electrically connected to the secondary winding and the second power board.

7. The power converter of claim 1 wherein the secondary winding of the transformer is a plate winding.

8. The power converter of claim 1 further comprising an electrical isolator positioned on the first side of the transformer between the first power board and the transformer.

9. The power converter of claim 1 further comprising a nonconductive carrier extending about a portion of the transformer.

10. The power converter of claim 1 wherein the nonconductive cover includes a pick and place surface.

11. The power converter of claim 1 wherein the nonconductive cover includes structure on an interior side of the cover for aligning the first power board and/or the second power board with the transformer.

12. The power converter of claim 1 wherein the nonconductive cover includes an outwardly extending flange along a bottom side edge of the nonconductive cover.

13. The power converter of claim 1 wherein the first power board includes one or more wire wrap terminals terminating one or more conductors from the transformer.

14. The power converter of claim 1 wherein the power converter is cuboidal.

15. The power converter of claim 1 further comprising said one or more other circuit boards.

16. A computer server comprising the power converter of claim 1.

17. The power converter of claim 3 wherein the switch of the primary side circuit is positioned between the first power board and the first side of the transformer, and the switch of the secondary side circuit is positioned between the second power board and the second side of the transformer.

18. The power converter of claim 3, wherein the switch of the primary side circuit and the switch of the secondary side circuit are thin FETs.

19. The power converter of claim 6 wherein the busbar and the second power board are configured for mechanically interlocking with one another.

20. The power converter of claim 7 further comprising a busbar electrically connected to the secondary winding and the second power board, the busbar formed monolithically with the secondary plate winding.

21. The power converter of claim 8 wherein the electrical isolator includes structure for aligning the first power board with the first side of the transformer.

22. The power converter of claim 9 wherein the nonconductive carrier includes structure for aligning the first power board and the second power board with the first side and the second side, respectively, of the transformer.

23. The power converter of claim 18 wherein the switch of the secondary side circuit is a self-driven synchronous rectifier.

24. An isolated switching power converter comprising:
a power isolation transformer having a primary winding, a secondary winding and a plurality of sides;
a nonconductive carrier extending about a portion of the transformer;
a first power board mechanically coupled to a first side of the transformer and including a primary side circuit electrically coupled to the primary winding;
a second power board mechanically coupled to a second side of the transformer and including a secondary side circuit electrically coupled to the secondary winding; and
a nonconductive cover extending over and around at least portions of the transformer and the first power board, wherein the nonconductive cover is vented adjacent the secondary winding.

25. The power converter of claim 24 wherein the nonconductive carrier includes structure for aligning the first power board and the second power board with the first side and the second side, respectively, of the transformer.

26. The power converter of claim 24 wherein the nonconductive carrier includes electrical terminals electrically connected to the first power board and the second power board for electrically coupling the first power board and the second power board to one or more other circuit boards.

27. The power converter of claim 26 wherein the electrical terminals are pins or surface mount terminals.

* * * * *